June 5, 1962 K. M. ST. JOHN 3,038,027

SIGNAL-TRANSLATING CIRCUIT

Filed Dec. 1, 1959

United States Patent Office 3,038,027
Patented June 5, 1962

3,038,027

SIGNAL-TRANSLATING CIRCUIT

Karl M. St. John, Hicksville, N.Y., assignor to Hazeltine Research, Inc., a corporation of Illinois Filed Dec. 1, 1959, Ser. No. 856,534
8 Claims. (Cl. 178—7.3)

Figures 1, 2:
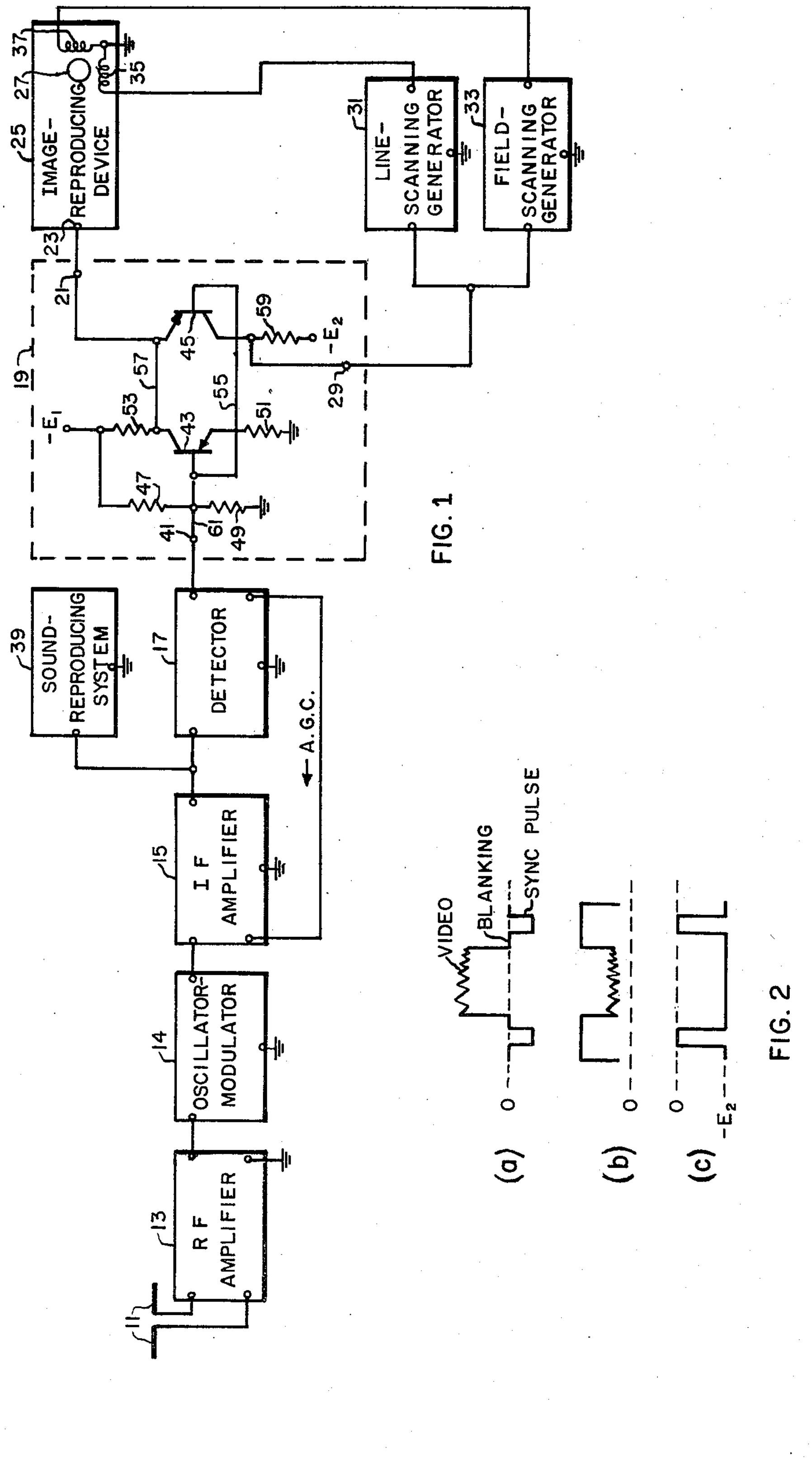

This invention pertains to signal-translating circuits having a high degree of immunity to undesired interference accompanying the signal to be translated, and particularly to a transistorized combined video amplifier and synchronizing pulse separator which also has the feature of maintaining synchronous operation of a television receiver even in the presence of considerable noise accompanying the received television signal.

In accordance with present television practice, there is developed at the transmitter a signal which includes a video component representing the variations in brightness of the transmitted image at successive points along successive closely spaced scanning lines. The signal also includes a synchronizing pulse component periodically interspersed with the video component which marks the instant at which each of the successive scanning lines is generated. These pulses are superposed on somewhat longer duration blanking pulses which are produced during the retrace interval between successive scanning lines, the blanking pulses being at the "black" level of the video signal. At the receiver the complete signal is utilized to control the light intensity produced at each point in successive scanning lines produced on the screen of an image-reproducing device by line-scanning and field-scanning generators similar to those at the transmitter. In addition, the synchronizing pulse component is separated and applied to these generators to maintain the scanning operation at the receiver accurately synchronized with that at the transmitter. The accompanying blanking pulses drive the intensity of the light on the screen to "black" during each retrace interval, so that the synchronizing pulses and the scanning beam retrace will not be visible.

It may be noted that the conventional practice in the United States is to modulate the transmitted carrier wave so that the maximum signal amplitude is at the peak of the synchronizing pulses. The blanking pulses are then at a lower potential with the video component extending still lower. This terminology will, therefore, be employed even though the relative potential levels of the video, blanking, and synchronizing components relative to the ground potential of the receiver may be reversed due to phase inversion at various stages.

Clearly, in order to accurately reproduce the transmitted image the synchronization of the line- and field-scanning generators at the receiver with those at the transmitter must be very accurately established and maintained. Even a momentary variation from synchronous operation may cause the received image to "tear" or render it completely unintelligible. This problem is complicated by the fact that high amplitude impulse noise accompanying the received signal may reduce or increase the apparent amplitude of the synchronizing pulses, and so either interrupt or cause false synchronization of the scanning generators. Various types of noise-immunizing circuits have been devised for use in the apparatus by which the synchronizing pulses are separated from the complete received signal, but these are relatively complex and expensive to manufacture and add materially to the size, weight, and power supply requirements of the complete television receiver. These characteristics are a particular disadvantage in receivers wherein transistors are employed in lieu of vacuum tubes, wherever possible, in order to achieve reduced size, weight, and power consumption.

Accordingly, an object of the invention is to provide a transistorized signal-translating circuit of compact and economical construction which amplifies and separates each of interspersed components of a composite received signal.

A further object is to provide such a circuit which maintains correct operation in spite of a high degree of interference accompanying the received signal.

A further object is to provide a transistorized combined video amplifier and synchronizing pulse separator for a received television signal which will maintain correct synchronous operation even in the presence of interfering pulses affecting the amplitude of the synchronizing and blanking components of the signal.

A further object is to provide a transistorized combined video amplifier and synchronizing pulse separator translating circuit for a received television signal which accurately separates the synchronizing pulse component thereof regardless of the presence of interference causing an apparent decrease or increase in synchronizing pulse amplitude and without employing any auxiliary circuits for achieving such immunity from interference.

A signal-translating circuit in accordance with the invention is adapted to translate a received signal which includes a first component below a fixed reference potential level and an interspersed second component extending upward from such reference potential level. The circuit comprises a pair of transistors together with means for biasing the first transistor so that it produces an amplified signal in response to an applied signal below the foregoing reference potential level while becoming saturated when the applied signal extends above that level. The signal-translating circuit also comprises means connected to the first transistor adapted to bias the second transistor so that it produces an amplified signal in response to a signal applied thereto during saturation of the first transistor and will remain nonconductive while the first transistor is unsaturated. Means are also provided for applying the received signal to each of the transistors. The first and second transistors thereby respectively amplify the first and second of the received signal components.

Such a signal-translating circuit may further comprise means included in the above-mentioned biasing means for the second transistor for also causing it to saturate when the signal applied thereto extends to a predetermined potential to which the second received signal component extends above the described reference potential level. The second transistor will then amplify the second received signal component while remaining nontranslating with respect to interfering signals extending beyond such predetermined potential.

A more complete description of the invention, together with other objects and additional features thereof, is presented in the following specification and accompanying drawing, noting however that the actual scope of the invention is pointed out in the succeeding claims.

Referring to the drawing:

FIG. 1 is a circuit diagram of a television receiver which includes a signal-translating circuit constructed in accordance with the invention, and FIG. 2 is a series of wave forms illustrating the results obtained with the circuit of FIG. 1.

*General Description of the Receiver of FIG. 1*

The receiver circuit in FIG. 1 includes an antenna 11 for receiving a signal which includes a first component below a fixed reference potential level and an interspersed second component extending to a predetermined potential above such level. Specifically, in the case of a television signal the first component referred to will be the video component while the second component will be the synchronizing pulse component. The reference potential level will be that of the blanking pulses on which the synchronizing pulses are superposed and which are periodically interspersed with the video component at intervals corresponding to successive scanning lines of the transmitted image. The sync pulses extend to a fixed peak potential above the blanking level. The complete signal is thus as shown by wave form (*a*) in FIG. 2. Of course, this composite signal is modulated on a high-frequency carrier wave by which it is transmitted.

The received modulated signal is translated by RF amplifier 13 to an oscillator-modulator 14 where the carrier wave is converted to a fixed intermediate frequency or IF, the modulation remaining substantially unaffected. The resulting IF signal is then translated by IF amplifier 15 to a detector 17 which derives the composite signal comprising the video and synchronizing components from the modulated IF signal and applies it to a signal-translating circuit 19 constructed in accordance with the invention. This circuit serves as a combined video amplifier and synchronizing pulse separator by which the video and synchronizing components of the received signal are separated from each other and respectively amplified. The amplified video component is produced at video output terminal 21 of circuit 19 and is applied to input terminal 23 of an image-reproducing device 25. The latter includes a luminous screen 27 on which it displays a visible image corresponding to that represented by the received signal. Circuit 19 also produces at its sync output terminal 29 the separated and amplified synchronizing pulse component of the received television signal. This component will actually comprise two series of pulses, one for synchronizing the line-scanning operation of image-reproducing device 25 and another for synchronizing the field-scanning operation thereof. The composite series of separated sync pulses is applied in common to the input terminals of a line-scanning generator 31 and field-scanning generator 33. These generators are respectively connected to the line- and field-scanning coils 35 and 37 by which the scanning spot on screen 27 is deflected in the horizontal and vertical directions. Since the line-scanning and field-scanning synchronizing pulses are of much different duration, generators 31 and 33 may be constructed so each responds only to the appropriate pulse series.

The IF signal produced by amplifier 15 may also be applied to a sound-reproducing system 39 which comprises its own detector, audio amplifier, and loudspeaker system for producing the sound corresponding to the modulated audio signal which is transmitted along with the television signal and which will be received therewith at antenna 11.

Since detector 17 serves to separate out the IF component of the modulated television IF signal, and since the strength of the IF component will depend on the received signal strength, detector 17 is also adapted to produce an automatic-gain-control voltage. This voltage may be fed back to IF amplifier 15 to control the gain thereof so as to stabilize the amplitude of the detected signal against variations in received signal strength.

The average brightness level on screen 27 of image-reproducing device 25 may be set so that when the potential of the video signal component at terminal 23 thereof corresponds to the blanking level of the complete signal the screen will be black. Proper background brightness of the reproduced image will then be maintained so long as the blanking potential remains fixed. This will be the case so long as circuit 19 preserves the D.-C. component of the composite signal derived by detector 17, which may be achieved by employing D.-C. signal coupling. While A.-C. coupling can be used together with suitable D.-C. restorer or clamping circuits, such circuits are sensitive to the peak potential of the synchronizing pulses and so tend to be susceptible to noise pulses imposed thereon.

*Construction of Signal-Translating Circuit 19*

Considering the construction of signal-translating circuit 19 of FIG. 1 in more detail, as stated above this circuit serves as a combined video amplifier and synchronizing pulse separator for the received television signal, the signal input thereto being provided by detector 17 between ground and its input terminal 41. The circuit comprises a pair of transistors 43 and 45, each having a base, a collector, and an emitter. It also comprises means for biasing the first transistor 43 so that it produces an amplified signal in response to an applied signal below the reference potential level of the signal received at terminal 41, while it becomes saturated when the applied signal extends above that level. Since the video component of the received signal is below (more positive than) the foregoing reference potential level, it is clear that transistor 43 will amplify that component. At the same time, inasmuch as the synchronizing pulse component extends upward from (more negative than) the reference potential level, transistor 43 is effectively nontranslating with respect to that component. Suitable biasing means for this purpose may comprise a D.-C. supply source $E_1$ connected to ground at its positive terminal and having its negative terminal connected by a resistor 47 to the base of transistor 43. The biasing means may also include the resistors 49 and 51 respectively connecting the base and emitter of transistor 43 to ground. Resistor 51 should be small, being provided only for temperature stabilization purposes, so that the emitter is therefore effectively at ground potential. Resistors 47 and 49 together form a voltage divider by which a small fraction of the potential $E_1$ is applied to the base of transistor 43 for establishing a negative bias of the base relative to the emitter. Since transistor 43 has been illustrated as a PNP transistor, this base-emitter bias will be in the forward or conducting direction. The negative terminal of D.-C. source $E_1$ is also connected to the collector of transistor 43 by means of a load resistor 53. For any given potential of the signal applied to the base of that transistor, the supplied base between the base and emitter may be set so the total forward potential between those electrodes causes transistor 43 to saturate. The collector-emitter voltage then drops to and remains substantially zero. Since the emitter will always be virtually at ground potential, the same potential will then exist at the collector and the collector-base junction will become forward biased. So long as this saturated condition exists the collector voltage will be substantially independent of signal variations at the base and transistor 43 will effectively be nontranslating. The described biasing means is adjusted so this condition is produced when the potential of a signal applied to the base of transistor 43 is at the blanking level of the received television signal provided by detector 17 at terminal 41.

Signal-translating circuit 19 also includes means connected to the first transistor 43, specifically the collector thereof, for biasing the second transistor 45 so that it produces an amplified signal in response to a signal applied thereto while transistor 43 is saturated and remains nonconductive when that transistor is unsaturated. As a result, transistor 45 will amplify the synchronizing component of a received television signal applied thereto while it will remain nontranslating for the video component thereof. Such biasing means for transistor 45 may include a first direct connection 55 between its base and the base of transistor 43. It may, in addition, comprise a second direct connection 57 between the collector of transistor 43 and the emitter of transistor 45. In this way the collector voltage of transistor 43 serves also as the emitter voltage of transistor 45, while the bases of both transistors are held at the same potential. Inasmuch as the collector of transistor 43 is biased in the reverse direction with respect to its base when that transistor is in the unsaturated state, the emitter of transistor 45 will then be reverse biased relative to its base and it will remain nontranslating. On the other hand, the forward collector bias of transistor 43 which exists when it is in the nontranslating saturated state will result in forward biasing of the emitter of transistor 45 relative to the base thereof and that transistor will then become translating.

The biasing means for the second transistor 45 may also include means for causing it to saturate when the signal applied thereto exceeds the predetermined potential to which the second received signal component extends above the reference potential, specifically the sync pulse peak potential. Such means may comprise a second D.-C. potential supply source $E_2$ connected to ground at its positive terminal and having its negative terminal connected to the collector of transistor 45 by a load resistor 59.

The signal-translating circuit 19 also includes means such as a direct current conductor 61 for applying the received signal at input terminal 41 thereof to each of the transistors. Specifically, the signal may be applied to the bases thereof by connecting conductor 61 to the direct connection 55 therebetween. In view of the direct coupling so provided from detector 17 to output terminals 21 and 29 of circuit 19 the blanking level for each scanning line portion of the input signal remains at a fixed potential level and no D.-C. restoration or clamping is required.

In many cases the video gain provided by circuit 19 will itself be adequate. If this is not the case, further gain may be obtained by including a video amplifier in the coupling between video output terminal 21 of circuit 19 and video input terminal 23 of image-reproducing device 25.

*Operation of Signal-Translating Circuit 19*

The detected received signal applied at input terminal 41 of signal-translating circuit 19 will be of the type shown by wave form (*a*) in FIG. 2. While the potential corresponding to the blanking level thereof may be set as desired by appropriate adjustment of the detector 17, for convenience of description it will be assumed that the blanking level is at ground potential. In addition, as suggested by that wave form, the detection polarity is assumed to be such that the received signal sync pulse component at terminal 41 extends in the negative direction and that the video component extends in the positive direction relative to ground potential. The forward bias between the base and emitter of transistor 43 is therefore set so that saturation occurs and the accompanying substantially constant collector saturation voltage is produced when the signal potential applied at the base thereof via input terminal 41 and conductor 61 is at ground level. Since transistor 43 is of the PNP type, it will, therefore, remain saturated during occurrence of the negative polarity synchronizing component of the signal. However, during the positive polarity video component the net forward potential between the base and emitter will be below that required for saturation and the transistor will serve as an amplifier producing an amplified video signal at its collector. Since the collector of transistor 43 is D.-C. coupled to video output terminal 21 of circuit 19, the amplified video signal is supplied to image-reproducing device 25. The wave form of the video signals which will be separated in this manner is shown by curve (*b*) in FIG. 2.

Via the direct connection 55, the signal received at input terminal 41 of circuit 19 is also applied to the base of the second transistor 45. However, that connection and also the direct connection 57 from the collector of transistor 43 to the emitter of transistor 45 biases the latter transistor to remain nonconductive all during the time transistor 43 is in the unsaturated state. Specifically, during that interval the collector of transistor 43 is reverse biased with respect to the base, thus causing the emitter of transistor 45 to be reverse biased with respect to its base. Note that for this to be true transistors 43 and 45 should be of the same type. Since transistor 43 has here been illustrated as type PNP transistor 45 will also be type PNP. Of course, both could just as well be type NPN, with appropriate supply voltage polarity reversal. Near the blanking level of the received signal, however, transistor 43 saturates and its collector voltage rises to a level exceeding the potential at its base. Transistor 45 is thereby rendered conductive, and amplifies the sync pulse occurring during the blanking interval. Via the direct connection from the collector of transistor 45 to sync output terminal 29, of circuit 19, the separated and amplified sync pulses of the type shown by wave form (*c*) in FIG. 2 are applied to the line- and field-scanning generators 31 and 33 which control the scanning operation of image-reproducing device 25. Note that during the line-scanning interval when the video signal component occurs the potential at sync output terminal 29 remains constant at the potential $-E_2$, so that the scanning operation is effectively isolated from any undesired noise accompanying the received signal during such interval.

As indicated above, the collector bias of transistor 45 may be established by means of resistor 59 and the potential $-E_2$ so that when the potential of the received signal corresponds to that of the peak of each sync pulse transistor 45 will saturate. The potential at its collector will then remain at the substantially ground potential level which exists at the emitter by virtue of the concurrent saturation of transistor 43. As a result, no change in the potential at sync output terminal 29 can occur in response to noise pulses which may be riding the peak of any of the sync pulses. At the same time, as already stated, transistor 45 only begins to conduct when transistor 34 saturates, and since this only occurs when the input signal is at the established blanking potential level, the potential $-E_2$ from which each sync pulse extends remains fixed regardless of the presence of noise which may tend to move the apparent blanking level in the positive direction relative to ground. This clamping of both the base and the peak levels of the sync component of the received signal results in an extremely high degree of immunity of the receiver from interference.

While a wide variety of specific values of the circuit elements in the embodiment of the invention shown in FIG. 1, may be employed, a particular set of suitable values thereof may be as follows:

| | | |
|---|---|---|
| D.-C. supply $E_1$ | volts | 12.7 |
| D.-C. supply $E_2$ | do | 3.1 |
| Transistor 43 | | 2N247 |
| Transistor 45 | | 2N139 |
| Resistor 47 | kilohms | 82 |
| Resistor 49 | do | 6.3 |
| Resistor 51 | ohms | 220 |
| Resistor 53 | kilohms | 5.6 |
| Resistor 59 | do | 5.6 |

Although the invention has been described with reference to a particular embodiment thereof, it will be apparent to those skilled in the art that many modifications and variations may be made without departing from the true spirit and scope of the invention as defined by the ensuing claims.

What is claimed is:

1. A signal-translating circuit for a received signal which includes a first component below a fixed reference potential level and an interspersed second signal component extending above such reference potential level, said circuit comprising: a pair of transistors; means for biasing the first of said transistors so that it produces an amplified signal in response to an applied signal below said reference potential level while becoming saturated when the applied signal extends above that level; means connected to said first transistor for biasing the second transistor so that it produces an amplified signal in response to a signal applied thereto while said first transistor is saturated and remains nonconductive while said first transistor is unsaturated; and means for applying said received signal to each of said transistors; whereby said first and second transistors respectively amplify said first and second received signal components.

2. A signal-translating circuit for a received signal which includes a first component below a fixed reference potential level and an interspersed second signal component extending above such reference potential level, said circuit comprising: a pair of transistors each having a base, an emitter and a collector; means for biasing the first of said transistors so that it produces an amplified signal at its collector in response to an applied signal at its base below said reference potential level while producing a substantially constant saturation voltage at its collector when the applied signal extends above that level; means connected to said first transistor and responsive to the collector voltage thereof for biasing the second transistor so that it produces an amplified signal in response to a signal applied at its base while said first transistor is saturated and remains nonconductive when said first transistor is unsaturated; and means for applying said received signal to the bases of said transistors; whereby said first and second transistors respectively amplify said first and second received signal components while remaining nontranslating for the other received signal component in each case.

3. A signal-translating circuit for a received signal which includes a varying signal component below a fixed reference potential level and an interspersed pulse component extending above such reference potential level, said circuit comprising: a pair of transistors each having a base, an emitter, and a collector; means for applying a bias between the base and emitter of the first of said transistors which causes it to produce an amplified signal at its collector in response to an applied signal at its base below said reference potential level while producing a substantially constant saturation voltage at its collector when the applied signal extends above that level; means including a direct connection between the collector of said first transistor and the emitter of the second transistor for biasing the second transistor so that it produces an amplified signal in response to a signal applied at its base while said first transistor is saturated and remains nonconductive when said first transistor is unsaturated; and means for applying said received signal to the bases of said transistors; whereby said first transistor amplifies said varying received signal component and remains saturated during occurrence of said pulse component and said second transistor amplifies said pulse component and remains nonconductive during occurrence of said varying component.

4. A signal-translating circuit for a received signal which includes a first component below a fixed reference potential level and an interspersed second signal component extending above such reference potential level, said circuit comprising: a pair of transistors each having a base, an emitter, and a collector; means for applying a bias between the base and emitter of the first of said transistors which causes it to produce an amplified signal at its collector in response to an applied signal at its base below said reference potential level while producing a substantially constant saturation voltage at its collector when the applied signal extends above that level; a first direct connection between the bases of said transistors; a second direct connection between the collector of said first transistor and the emitter of the second transistor; means including said two direct connections for biasing said second transistor so that it produces an amplified signal at its collector in response to a signal applied at its base while said first transistor is saturated and remains nonconductive when said first transistor is unsaturated; and means for applying said received signal in common to said first direct connection; whereby said first and second transistors respectively amplify said first and second received signal components while remaining nontranslating for the other received signal component in each case.

5. A signal-translating circuit for a received signal which includes a first component below a fixed reference potential level and an interspersed second signal component extending to a predetermined potential above such reference potential level, said circuit comprising: a pair of transistors; means for biasing the first of said transistors so that it produces an amplified signal in response to an applied signal below said reference potential level while becoming saturated when the applied signal extends above that level; means connected to said first transistor for biasing the second transistor so that it produces an amplified signal in response to a signal applied thereto while said first transistor is saturated and remains nonconductive while said first transistor is unsaturated; means included in said means for biasing said second transistor for also causing it to saturate when the signal applied thereto extends to said predetermined potential above said reference potential level; and means for applying said received signal in common to each of said transistors; whereby said first transistor amplifies said first received signal component and remains non-translating during occurrence of said second received signal component and said second transistor amplifies said second received signal component and remains nontranslating during occurrence of said first received signal component and for signals which extend beyond said predetermined potential during occurrence of said second received signal component.

6. A signal-translating circuit for a received signal which includes a first component below a fixed reference potential level and an interspersed second signal component extending to a predetermined potential above such reference potential level, said circuit comprising: a pair of transistors each having a base, an emitter and a collector; means for applying a bias between the base and emitter of the first of said transistors which causes it to produce an amplified signal at its collector in response to an applied signal at its base below said reference potential level while producing a substantially constant saturation voltage at its collector when the applied signal extends above that level; means including a direct connection between the collector of said first transistor and the emitter of the second transistor for biasing the second transistor so that it produces an amplified signal at its collector in response to a signal applied at its base while said first transistor is saturated and remains nonconductive when said first transistor is unsaturated; means included in said means for biasing said second transistor for also causing it to saturate when the signal applied to its base extends to said predetermined potential above said reference potential level; and means for applying said received signal in common to the bases of said transistors; whereby said first transistor amplifies said first received signal component and remains nontranslating during occurrence of said second received signal component and said second transistor amplifies said second received signal component and remains nontranslating during occurrence of said first received signal component and for signals which extend beyond said predetermined potential during occurrence of said second received signal component.

7. A combined video amplifier and synchronizing pulse separator for a received television signal which includes a video component below a fixed blanking potential level and a periodically interspersed synchronizing pulse component extending above the blanking potential level, said circuit comprising: a pair of transistors each having a base, a collector, and an emitter; means for applying a bias between the base and emitter of the first of said transistors which causes it to produce an amplified signal at its collector in response to an applied signal at its base below said blanking potential level while producing a substantially constant saturation voltage when the applied signal extends above that level; a first direct connection between the bases of said transistors; a second direct connection between the collector of said first transistor and the emitter of the second transistor; means including said two direct connections for biasing said second transistor so that it produces an amplified signal at its collector in response to a signal applied at its base extending above said blanking potential level and remains nonconductive when said first transistor is unsaturated; and means for applying said received television signal in common to said first direct connection; whereby said first and second transistors respectively amplify said video and synchronizing components of the received signal while remaining nontranslating for the other received signal component in each case.

8. A combined video amplifier and synchronizing pulse separator for a received television signal which includes a video component below a fixed blanking potential level and a periodically interspersed synchronizing pulse component etending to a fixed peak potential above the blanking potential level, comprising: a pair of transistors of the same type conductivity each having a base, an emitter, and a collector; a first direct connection between the bases of said transistors; first potential supply means connected between the collector and emitter of the first of said transistors and between said first direct connection and the emitter thereof for biasing said first transistor so that it produces an amplified signal at its collector in response to a signal applied at its base below said blanking potential level while producing a substantially constant saturation voltage at its collector when the applied signal extends above that level; a second direct connection between the collector of said first transistor and the emitter of the second transistor; said second transistor being biased by said first potential supply means and said two direct connections so that it produces an amplified signal at its collector in response to a signal applied at its base extending above said blanking potential level and remains nonconductive when said first transistor is unsaturated; second potential supply means connected between the emitter and collector of said second transistor for further biasing it so that it saturates when the signal applied thereto extends to said predetermined potential above said blanking potential level; and means for applying said received signal to said first direct connection; whereby said first transistor amplifies said received video signal component and remains nontranslating during occurrence of said received synchronizing signal component and said second transistor amplifies said synchronizing signal component and remains nontranslating during occurrence of said video signal component and for signals which extend beyond said fixed peak potential during occurrence of said synchronizing signal component.

References Cited in the file of this patent

UNITED STATES PATENTS

| | | |
|---|---|---|
| 2,864,888 | Goodrich | Dec. 16, 1958 |
| 2,890,352 | Goodrich | June 9, 1959 |
| 2,906,817 | Kidd | Sept. 29, 1959 |
| 2,935,625 | Schayes | May 3, 1960 |